May 30, 1967  P. M. YAVORSKY  3,322,951
EFFICIENT BETA-RAY EMISSION SOURCE FOR IRRADIATION APPLICATIONS
Filed Aug. 28, 1964
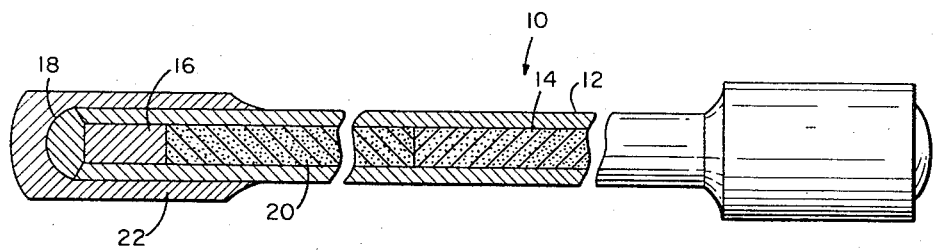
INVENTOR.
PAUL MICHAEL YAVORSKY
BY

United States Patent Office 3,322,951
Patented May 30, 1967

3,322,951
EFFICIENT BETA-RAY EMISSION SOURCE FOR IRRADIATION APPLICATIONS
Paul M. Yavorsky, Monongahela, Pa., assignor to the United States of America as represented by the United States Atomic Energy Commission
Filed Aug. 28, 1964, Ser. No. 392,975
1 Claim. (Cl. 250—106)

ABSTRACT OF THE DISCLOSURE

An efficient beta ray emission source for irradiation application consisting of a core composed of tightly compacted particulate strontium-90 titanate intimately encapsulated within a thin stainless steel sheath.

This invention is related to a novel beta radiation source and method of making same. More particularly it is related to a strontium-90 titanate swaged beta radiation source and process for making same.

The use of radiation in chemical processing is well known to those skilled in the art. For radiation processes at high temperatures and high pressures, the manner of supplying the radiation demands special consideration. Beta radiation sources inside a chemical reactor have a distinct advantage over other forms of radiation e.g. gamma rays, accelerator electrons, and hard X-rays. Internal beta sources afford a high level of radiation in the reaction zone in a relatively small source. More than 100 times as many curies of a gamma emitter, such as cobalt 60, would be required to give the same useful radiation dose rate as obtained from an internal beta radiation source in a high pressure reactor. This is because beta rays deposit the bulk of the energy along a short path inside the reactor where it is needed, as opposed to gamma rays which wastefully dissipate their energy over long ranges in the surrounding environment. Further, a beta source would require much less shielding thus limiting the cost of processing equipment.

The use of beta radiation in chemical processes as a substitute for catalysts has been proposed in the field of hydrogenation of coal and many other chemo-nuclear processes. It has been proposed to utilize strontium-90 compounds embodied in ceramic forms or spheres to carry out these processes. The use of such ceramic coated or wholly ceramic beta radiation elements has been found undesirable due to a tendency for the ceramic material surrounding or bearing the strontium-90 to abrade away and cause leaching out of strontium-90 into the system and it is well known in the art that released strontium-90 presents extreme health hazards due to the fact of its ability to be assimilated into human bone tissue. Previously, those skilled in the art have also attempted to utilize strontium-90 beta radiation materials which have been loosely encapsulated in stainless steel in the form of hollow needles. However, the needles, as utilized in the prior art irradiation processes, would not withstand the rigorous temperature and pressure conditions required in high pressure chemical reactions.

Radiation alone at ambient conditions is not a sufficient agent for economical production in many chemical processes especially in the proposed processes for the use of beta radiation in the hydrogenation of coal or any other high pressure reaction. To have commercial practicality, a radiation process usually must replace an expensive catalytic system, generate a reaction at somewhat less rigorous conditions than is usually employed or yield a better or unique product of high value. Thus, many of the systems where it is proposed to employ a beta radiation source also require the use of high temperatures and pressures as well as radiation. In the past, such proposals of use of radiation at high pressures and temperatures of necessity had to be abandoned due to the unavailability of a beta radiation source which could operate efficiently and safely under such conditions.

SUMMARY OF THE INVENTION

This invention discloses a source design that efficiently provides a high intensity of emitted or external beta radiation from a structure that has sufficient physical strength and anti-leak integrity to be useable over a wide temperature range and at pressures ranging from vacuum to 5000 p.s.i. The thin sheath and small diameter minimize self-absorption while the tight compaction of the core being in intimate contact with the sheath leads to physical strength under rigorous conditions.

It is an object of this invention to provide those skilled in the art with a relatively inexpensive, highly efficient beta radiation source for use in chemical processing at rigorous conditions of pressure and temperature.

It is a further object of this invention to provide those skilled in the art with a beta radiation source and process for making same, which source is useful at high temperatures and pressures with minimal dangers resulting from the fabrication and use of the beta radiation source.

These and other parts of the invention will in part be obvious and will in part appear hereinafter as illustrated in the accompanying drawings:

The figure shows in partial cross section a preferred embodiment of a source embodying the principles of this invention.

It has unexpectedly been discovered that these and other objects of the invention can readily be achieved by the use of a supple, high intensity chemonuclear fuel element comprising a tightly compacted shaped core made up of a powdered beta ray emitting solids such as strontium-90 containing compounds e.g. strontium-90 titanate and a thin shaped metal sheath encapsulating the core, said sheath being in intimate contact with the external surface of the core material. As shown in the figure the cross-sectional form of the element 10 can be cylindrical, square, rectangular, elliptical or any other shape that can be formed by machine swaging operations that are now well known in the metal forming art. The fuel element 10 should have an outside cross-section dimension of less than ⅛" (125 mils) and a metal sheath 12 having a wall thickness that is less than the beta ray absorption equivalent of 6 mils of stainless steel, in order to avoid energy waste and internal dissipation of the radiation being caused by the element. When fuel element 10 is a cylindrical, tubular fuel element with a 5 mil stainless steel sheath is wound into a helical configuration in order to provide a high intensity maximum dosage to material coming in contact with the element. In fuel element 10 we utilize strontium-90 titanate 14 as the core due to the fact that this compound is not assimilated by the human body and retained therein, to minimize the harm to the health of anybody coming in contact therewith. Thus a significant advantage in safety is gained by the use of my novel fuel element. Further it, has excellent compaction properties, suitable for the swaging fabrication method.

Fuel element 10 is produced by a novel process wherein a tube of any malleable metal 12 having an outside diameter ranging from about 150 mils to about 40 mils, and a wall thickness ranging from about 20 mils to about 2 mils, is filled with core 14 of finely powdered strontium-90 titanate. The filled tube is plugged at both ends with care being taken to make sure that the plugs 16 do not hermetically seal the tubes in order that any gas contained therein may be easily removed from the tube during the swaging operation. Swaging is done by commercially available continuous machines. After the tube is loaded and plugged the diameter of the tube is then reduced by swaging the tube to cause a further compaction of the core material, care being taken to avoid reduction of the wall thickness of the fuel element 10 during the swaging. Thereafter the ends of the tube are tightly sealed by any means such as heliarc weld 18 covered with solder 22. When a stainless steel sheath 12 is used, it is heated after swaging to a temperature of about 2000° F. to anneal the tube to produce the supple chemo-nuclear fuel elements of this invention. Other metals will require specific annealing. Basically, a preferred form of this new source is made by swaging 5 mil walled stainless steel sheath 12 over granulated strontium-90 titanate. The swaging process transforms the titanate 14 into a hard compaction inside a tight metal sheath 12. The compaction supports the metal wall against flexion under pressure, preventing metal strains and possible rupture. Other sources which used hollow needles and spheres with loose packing are flattened under pressure and temperatures utilized in the processes in which they were attempted to be used and eventually fracturing and leakage occurred causing contaminated materials to be dispersed into the system to which they were applied.

My novel fuel elements can not flatten under pressure, due to the fact that there is no mechanical void space after the swaging. In the hydrogenation of coal, the beta radiation source must be capable to withstand pressures up to 5000 p.s.i. and temperatures up to 500° C. without rupture and subsequent leakage of the radioactive materials. My novel fuel elements can readily withstand such vigorous conditions without damage.

In fuel element 10, about 10 inches at both ends of the sheath 12, during the loading operation, are filled with non-radioactive strontium titanate 20 in order to facilitate welding of the ends of the tube without radioactive contamination. After welding, the welds usually by heliarc, are covered with silver solder to further insure that no leaks will occur in the tubes. A significant advantage of my novel process is that all the apparatus required to carry out the process can fit into the work space of one ordinary hot-cell. The process can readily be carried out with remote manipulators.

The following example is given as an illustration of the practice of my invention and is not to be construed in a limiting sense.

*Example I*

A seven foot long stainless steel tube having an outside diameter of 92 mils with a wall thickness of 6 mils was positioned vertically in a hot cell with a steel plug inserted in the bottom end of the tube. This bottom end was also heliarc welded and the weld covered with silver solder to completely seal the bottom end of the tube. The tube was filled to a depth of one foot with finely powdered, non-radioactive strontium titanate and thereafter approximately 500 curies of strontium-90 titanate, equal to about 15.6 grams of finely powdered strontium-90 titanate, was added to the tube. The remaining space in the tube (approximately 1 foot) was filled with non-radioactive strontium titanate. A stainless steel plug was then pushed into the open top end of the tube and the tubing was then crimped over the plug. This end was not welded until after swaging to permit the escape of the "void space" air during compaction and volume reduction upon swaging. The loaded tube was then passed through a swaging machine which reduced the diameter of the tube from 94 mils to 64 mils and elongated the tube from 7 feet to 13.4 feet, while the fall thickness remained about 6 mils. The swaging work-hardened the tube, so that annealing was required prior to coiling the tube into its desired shape. The annealing further increased the suppleness of the finished fuel element, tending to decrease the hazards of cracking of the element. The work-hardened tube was coiled into a nine inch coil (diameter) and the coil was placed in a pre-heated annealing furnace for about ten minutes to reach a temperature of about 2000° F. The coil was then taken out of the furnace and quickly quenched in a water bath to complete the annealing. The annealed tube was then very supple, the end of the tube, containing 10 inches of non-radioactive strontium titanate was then welded shut and the weld covered with silver solder to lock any contaminates on the outside surface of the tubing near the welded end and to assure against pinholes in the heliarc welds.

The coil was then leak tested by immersing it in liquid nitrogen followed by immersion in methanol. Any leaks present would have been revealed by bubbling of nitrogen gas from the tube source as it warmed in the methanol. No leaks were present.

The annealed, sealed and leak tested swaged tube source was then wound into a ½ inch diameter coil on a motorized spindle. The supple coil was then stretched to a coil length of 16 inches and folded into four parallel sections with each connected section a little less than four inches long.

The entire operation was carried out in a hot-cell with the use of mechanical manipulators due to the inherent health hazards present during the fabrication of the radioactive source. Obviously this method of fabrication provides many advantages since it can be readily carried out with a minimum of equipment and radiation hazard to the health of the operator.

The finalized shape of the coil prepared in this example, into four parallel sections was chosen to adapt the coil for use in a chemical reactor having a reaction chamber 2 inches in diameter and four inches high. The reactor chamber was surrounded with a 2 inch solid aluminum heating jacket plus two inches of magnesia insulation. This assembly was continued in a box having a one-inch thick lead wall for additional shielding. Thus a versatile, relatively inexpensive chemical reactor having a high intensity beta radiation source useful for the actual carrying out of chemical processes as well as experimental reactor is provided for those skilled in the art. It must be understood of course that the final shape of the beta radiation source would be dependent upon the process used, the type and size of the reactor chosen to carry the process out in and any other physical facts which may require various other shapes or configurations. However, since my novel fuel element is supple it is easily shaped into any configuration that may be desired by an operator.

I claim:

A beta ray emitting chemo-nuclear fuel element comprising;
(a) a tightly compacted cylindrically shaped core consisting of fine particles of strontium-90 titanate, said core having a helical shape and a core diameter of less than 119 mils;
(b) a thin tubularly shaped stainless steel sheath having a thickness of less than 6 mils, encapsulating said core and being in intimate contact with the outer surface of the core.

References Cited

UNITED STATES PATENTS

| | | | |
|---|---|---|---|
| 2,592,115 | 4/1952 | Carroll | 250—106 |
| 2,797,333 | 6/1957 | Reiffel | 250—84 |
| 2,820,751 | 1/1958 | Saller | 72—122 |
| 3,253,152 | 5/1966 | Lahr | 250—84 X |

RALPH G. NILSON, *Primary Examiner.*

S. ELBAUM, *Assistant Examiner.*